United States Patent
Liang

(10) Patent No.: US 9,063,888 B2
(45) Date of Patent: Jun. 23, 2015

(54) PROGRAM CODE LOADING AND ACCESSING METHOD, MEMORY CONTROLLER, AND MEMORY STORAGE APPARATUS

(75) Inventor: Ming-Jen Liang, Hsinchu (TW)

(73) Assignee: PHISON ELECTRONICS CORP., Miaoli (TW)

( * ) Notice: Subject to any disclaimer, the term of this patent is extended or adjusted under 35 U.S.C. 154(b) by 491 days.

(21) Appl. No.: 13/196,874

(22) Filed: Aug. 2, 2011

(65) Prior Publication Data

US 2012/0297115 A1 Nov. 22, 2012

(30) Foreign Application Priority Data

May 18, 2011 (TW) .............................. 100117417 A

(51) Int. Cl.
| | | |
|---|---|---|
| *G06F 12/10* | (2006.01) | |
| *G06F 11/14* | (2006.01) | |
| *G06F 12/08* | (2006.01) | |
| *G06F 12/02* | (2006.01) | |
| *G06F 9/445* | (2006.01) | |
| *G06F 11/10* | (2006.01) | |

(52) U.S. Cl.
CPC ......... *G06F 11/1417* (2013.01); *G06F 12/0802* (2013.01); *G06F 12/0246* (2013.01); *G06F 9/44536* (2013.01); *G06F 11/1008* (2013.01)

(58) Field of Classification Search
CPC ............ G06F 12/0246; G06F 12/0802; G06F 11/1417; G06F 9/44536
USPC ......................................................... 711/103
See application file for complete search history.

(56) References Cited

U.S. PATENT DOCUMENTS

| | | | | |
|---|---|---|---|---|
| 2003/0191916 | A1* | 10/2003 | McBrearty et al. | 711/162 |
| 2006/0083096 | A1* | 4/2006 | Yang | 365/230.03 |
| 2009/0248965 | A1* | 10/2009 | Lee et al. | 711/103 |

FOREIGN PATENT DOCUMENTS

| | | |
|---|---|---|
| CN | 1902583 | 1/2007 |
| CN | 101494086 | 7/2009 |
| CN | 102034537 | 4/2011 |

(Continued)

OTHER PUBLICATIONS

"Office Action of Taiwan Counterpart Application", issued on Jan. 20, 2014, p. 1-p. 16.

(Continued)

*Primary Examiner* — Jae Yu
(74) *Attorney, Agent, or Firm* — Jianq Chyun IP Office

(57) ABSTRACT

A method of loading a program code from a rewritable non-volatile memory module is provided, wherein the program code includes data segments and two program code copies corresponding to the program code are stored in the rewritable non-volatile memory module. The method includes loading a first data segment of a first program code copy and determining whether the first data segment contains any uncorrectable error bit. The method still includes, when the first data segment does not contain any uncorrectable error bit, loading a second data segment of the first program code copy. The method further includes, when the first data segment contains an uncorrectable error bit, loading a first data segment of a second program code copy, and then loading a second data segment of the first program code copy or the second program code copy. Thereby, the program code can be successfully loaded.

16 Claims, 10 Drawing Sheets

(56) References Cited

FOREIGN PATENT DOCUMENTS

| | | |
|---|---|---|
| TW | 200534092 | 10/2005 |
| TW | 201015331 | 4/2010 |

OTHER PUBLICATIONS

"First Office Action of China Counterpart Application", issued on Jul. 14, 2014, p. 1-p. 9.

* cited by examiner

PROGRAM CODE LOADING AND ACCESSING METHOD, MEMORY CONTROLLER, AND MEMORY STORAGE APPARATUS

CROSS-REFERENCE TO RELATED APPLICATION

This application claims the priority benefit of Taiwan application serial no. 100117417, filed May 18, 2011. The entirety of the above-mentioned patent application is hereby incorporated by reference herein and made a part of this specification.

BACKGROUND

1. Technology Field

The present invention generally relates to a program code loading and accessing method, and more particularly, to a method of loading and accessing a program code in a rewritable non-volatile memory module, and a memory controller and a memory storage apparatus using the same.

2. Description of Related Art

Along with the widespread of digital cameras, cell phones, and MP3 in recently years, the consumers' demand to storage media has increased drastically. Rewritable non-volatile memory is one of the most adaptable storage media to portable electronic products (for example, cell phones, personal digital assistants (PDAs), and notebook computers) due to its many characteristics such as data non-volatility, low power consumption, small volume, non-mechanical structure, and fast access speed. Thus, in recent years, the flash memory industry has become a major part of the electronic industry.

Conventionally, the firmware code (program code) of a flash memory controller in a flash memory storage apparatus is stored in a programmable read-only memory (PROM, therefore is not updatable) inside the flash memory controller and is loaded into a static random access memory (SRAM) inside the flash memory controller to be executed when the flash memory controller is in operation. However, along with the increases in the size, complexity, and revision rate of firmware codes, firmware codes should be updatable and correctable. In order to reduce the sizes of storage apparatuses and conveniently update and correct firmware codes, some techniques have been developed for directly storing a firmware code into a NAND flash memory module of a memory storage apparatus and loading the firmware code into a SRAM of a memory controller when the flash memory storage apparatus is started. Since no additional PROM is disposed, the size and fabrication cost of the memory storage apparatus can be effectively reduced.

However, more bit errors may be detected in data stored in flash memory along with the increase in circuit integrity and the reduction in device size. In order to avoid such situation that a firmware code cannot be successfully loaded and accordingly the system cannot be started caused by too many bit errors, two (or more) program code copies of the firmware code are usually stored in a flash memory of the flash memory storage apparatus. If the entire first program code copy cannot be successfully read, the memory controller tries to load the entire second program code copy. However, if the entire second program code copy is still not successfully loaded, the flash memory storage apparatus cannot be started. Thereby, a more reliable firmware code loading method is desired.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a program code loading method, a program code accessing method, a memory controller, and a memory storage apparatus, wherein a program code can be effectively accessed in a rewritable non-volatile memory module.

According to an exemplary embodiment of the present invention, a program code loading method for loading a program code having a plurality of data segments from a rewritable non-volatile memory module is provided. The rewritable non-volatile memory module has at least one first physical block and at least one second physical block. The first physical block stores a first program code copy corresponding to the program code, the second physical block stores a second program code copy corresponding to the program code, and the first program code copy and the second program code copy respectively have a plurality of data segments identical to the data segments of the program code. The program code loading method includes sequentially loading a first data segment of the first program code copy and determining whether the first data segment of the first program code copy contains at least one uncorrectable error bit. The program code loading method further includes, when the first data segment of the first program code copy contains at least one uncorrectable error bit, alternatively loading a part of the first program code copy and a part of the second program code copy.

According to an exemplary embodiment of the present invention, a program code accessing method for accessing a program code in a rewritable non-volatile memory module is provided, wherein the rewritable non-volatile memory module has a plurality of physical blocks and the program code comprises a plurality of data segments. The program code accessing method includes storing a first program code copy corresponding to the program code by using at least one first physical block among the physical blocks, wherein the first program code copy has a plurality of data segments identical to the data segments of the program code. The program code accessing method also includes storing a second program code copy corresponding to the program code by using at least one second physical block among the physical blocks, wherein the second program code copy has a plurality of data segments identical to the data segments of the program code. The program code accessing method still includes sequentially loading a first data segment among the data segments of the first program code copy and determining whether the first data segment of the first program code copy contains at least one uncorrectable error bit. The program code accessing method further includes, when the first data segment of the first program code copy contains at least one uncorrectable error bit, alternatively loading a part of the first program code copy and a part of the second program code copy.

According to an exemplary embodiment of the invention, a memory controller for managing a rewritable non-volatile memory module is provided. The memory controller includes a host interface, a memory interface, and a memory management circuit. The host interface is configured to couple to a host system. The memory interface is configured to couple to the rewritable non-volatile memory module. The memory management circuit is coupled to the host interface and the memory interface. The memory management circuit uses at least one first physical block among the physical blocks to store a first program code copy corresponding to a program code, wherein the program code has a plurality of data segments, and the first program code copy has a plurality of data segments identical to the data segments of the program code. The memory management circuit also uses at least one second physical block among the physical blocks to store a second program code copy corresponding to the program code, wherein the second program code copy has a plurality of data segments identical to the data segments of the program code. The memory management circuit sequentially loads a first data segment among the data segments of the first program code copy and determines whether the first data segment of the first program code copy contains at least one uncorrectable error bit. When the first data segment of the first program code copy contains at least one uncorrectable error bit, the memory management circuit alternatively loads a part of the first program code copy and a part of the second program code copy.

According to an exemplary embodiment of the invention, a memory storage apparatus including a connector, a rewritable non-volatile memory module, and a memory controller is provided. The connector is configured to couple to a host system. The rewritable non-volatile memory module has a plurality of physical blocks. The memory controller is coupled to the connector and the rewritable non-volatile memory module. The memory controller uses at least one first physical block among the physical blocks to store a first program code copy corresponding to a program code, wherein the program code has a plurality of data segments, and the first program code copy has a plurality of data segments identical to the data segments of the program code. The memory controller also uses at least one second physical block among the physical blocks to store a second program code copy corresponding to the program code, wherein the second program code copy has a plurality of data segments identical to the data segments of the program code. The memory controller sequentially loads a first data segment among the data segments of the first program code copy and determines whether the first data segment of the first program code copy contains at least one uncorrectable error bit. When the first data segment of the first program code copy contains at least one uncorrectable error bit, the memory controller alternatively loads a part of the first program code copy and a part of the second program code copy.

As described above, the program code loading method, the program code accessing method, the memory controller, and the memory storage apparatus according to the present invention can effectively avoid a situation that a program code cannot be successfully loaded and accordingly a system cannot be started caused by too many bit errors.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
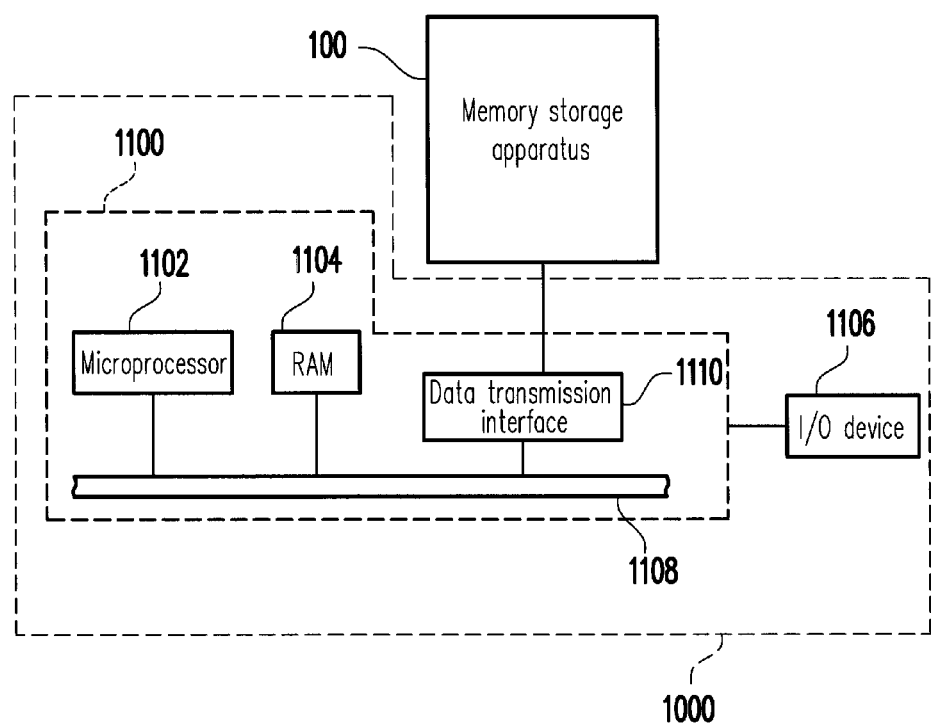
FIG. 1A illustrates a host system and a memory storage apparatus according to a first exemplary embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

First Exemplary Embodiment

Generally speaking, a memory storage apparatus (also referred to as a memory storage system) includes a rewritable non-volatile memory module and a controller (also referred to as a control circuit). The memory storage apparatus is usually used along with a host system so that the host system can write data into or read data from the memory storage apparatus.

FIG. 1A illustrates a host system and a memory storage apparatus according to the first exemplary embodiment of the invention.

Figure 1B:
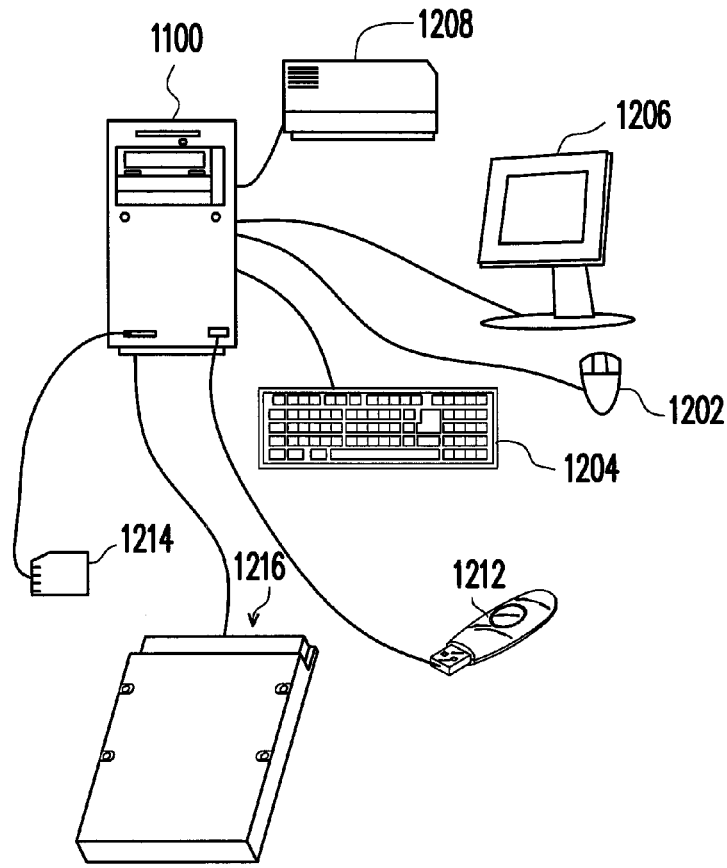
FIG. 1B is a diagram of a computer, an input/output (I/O) device, and a memory storage apparatus according to the first exemplary embodiment of the present invention.

Referring to FIG. 1A, the host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the I/O device 1106 is not limited to the devices illustrated in FIG. 1B and may further include other devices.

In the present embodiment, a memory storage apparatus 100 is coupled to other components of the host system 1000 through the data transmission interface 1110. The host system 1000 can write data into or read data from the memory storage apparatus 100 through the operations of the microprocessor 1102, the RAM 1104, and the I/O device 1106. The memory storage apparatus 100 is a rewritable non-volatile memory storage apparatus, such as flash drive 1212, a memory card 1214, or a solid state drive (SSD) 1216, as shown in FIG. 1B.

Figure 1C:
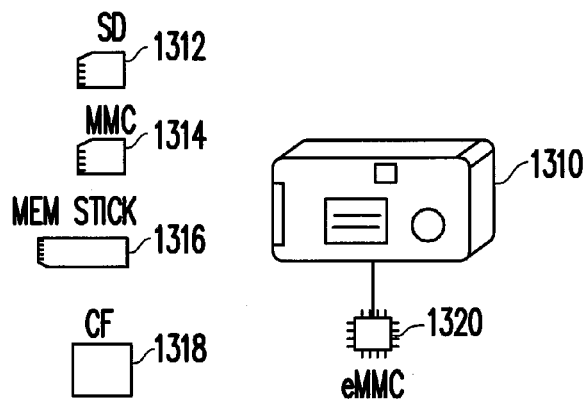
FIG. 1C is a diagram of a host system and a memory storage apparatus according to another exemplary embodiment of the invention.

Generally speaking, the host system 1000 can be substantially any system that can work with the memory storage apparatus 100 to store data. Even though the host system 1000 is described as a computer system in the present exemplary embodiment, in another exemplary embodiment of the invention, the host system 1000 may be a digital camera, a video camera, a communication device, an audio player, or a video player. For example, if the host system is a digital camera (video camera) 1310, the rewritable non-volatile memory storage apparatus is a secure digital (SD) card 1312, a multi media card (MMC) 1314, a memory stick (MS) 1316, a compact flash (CF) card 1318, or an embedded storage device 1320 (as shown in FIG. 1C) used by the digital camera (video camera) 1310. The embedded storage device 1320 includes an embedded MMC (eMMC). It should be mentioned that the eMMC is directly coupled to the motherboard of the host system.

Figure 2:
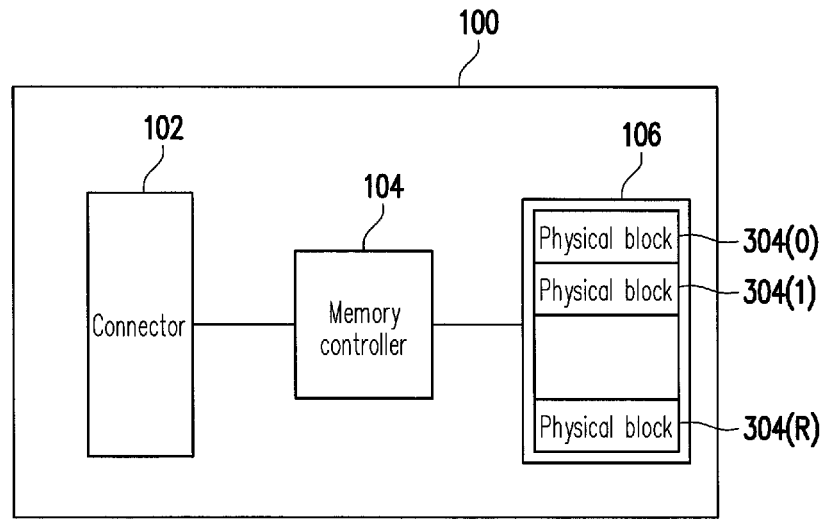
FIG. 2 is a schematic block diagram of the memory storage apparatus in FIG. 1A.

FIG. 2 is a schematic block diagram of the memory storage apparatus in FIG. 1A.

Referring to FIG. 2, the memory storage apparatus 100 includes a connector 102, a memory controller 104, and a rewritable non-volatile memory module 106.

In the present exemplary embodiment, the connector 102 is compatible to the serial advanced technology attachment (SATA) standard. However, the invention is not limited thereto, and the connector 102 may also be compatible to the Institute of Electrical and Electronic Engineers (IEEE) 1394 standard, the peripheral component interconnect (PCI) express standard, the universal serial bus (USB) standard, the SD interface standard, the MS interface standard, the MMC interface standard, the CF interface standard, the integrated device electronics (IDE) standard, or any other suitable standard.

The memory controller 104 executes a plurality of logic gates or control instructions implemented in a hardware form or a firmware form and performs various data operations on the rewritable non-volatile memory module 106 according to commands issued by the host system 1000. In particular, the memory controller 104 loads a program code from the rewritable non-volatile memory module 106 according to the program code accessing method provided by the present exemplary embodiment.

The rewritable non-volatile memory module 106 is coupled to the memory controller 104 and configured to store data written by the host system 1000. The rewritable non-volatile memory module 106 includes physical blocks 304 (0)-304(R). Each physical block has a plurality of physical pages, wherein the physical pages belonging to the same physical block can be individually written but have to be erased all together. To be specific, physical block is the smallest erasing unit. Namely, each physical block contains the least number of memory cells that are erased all together. One physical page is the smallest programming unit. Namely, one physical page is the smallest unit for writing data. In the present exemplary embodiment, the rewritable non-volatile memory module 106 is a multi level cell (MLC) NAND flash memory module. However, the present invention is not limited thereto, and the rewritable non-volatile memory module 106 may also be a single level cell (SLC) NAND flash memory module, any other flash memory module, or any memory module having the same characteristics.

Figure 3:
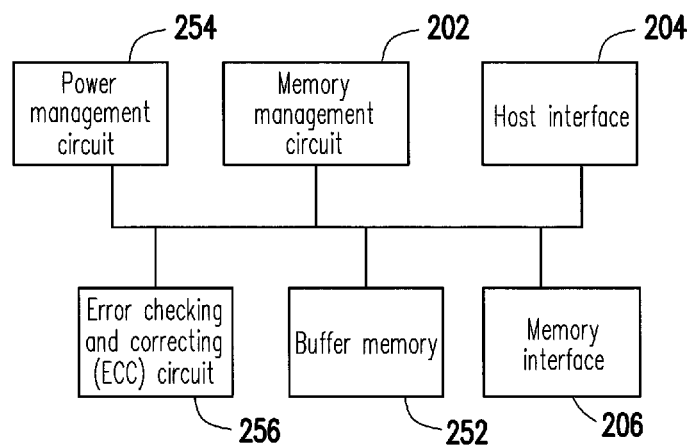
FIG. 3 is a schematic block diagram of a memory controller according to the first exemplary embodiment of the invention.

FIG. 3 is a schematic block diagram of a memory controller according to the first exemplary embodiment of the invention.

Referring to FIG. 3, the memory controller 104 includes a memory management circuit 202, a host interface 204, and a memory interface 206.

The memory management circuit 202 controls the overall operation of the memory controller 104. To be specific, the memory management circuit 202 has a plurality of control instructions, and when the memory storage apparatus 100 is in operation, the control instructions are executed to carry out various data operations.

To be specific, the control instructions of the memory management circuit 202 are stored in a specific area of the rewritable non-volatile memory module 106 (for example, a system area in the rewritable non-volatile memory module 106 exclusively used for storing system data) as program codes. In addition, the memory management circuit 202 has a microprocessor unit (not shown), a read-only memory (ROM, not shown), and a RAM (not shown). In particular, the ROM has a driving code segment. When the memory controller 104 is enabled, the microprocessor unit first executes the driving code segment to load the control instructions (i.e., a firmware code) from the rewritable non-volatile memory module 106 into the RAM of the memory management circuit 202. Thereafter, the microprocessor unit runs the control instructions to perform various data operations. In particular, the memory management circuit 202 loads a program code (also referred to as a firmware code) for controlling the overall operation of the memory controller 104 from the rewritable non-volatile memory module 106 according to the program code accessing method provided by the present exemplary embodiment.

The host interface 204 is coupled to the memory management circuit 202 and configured to receive and identify commands and data from the host system 1000. Namely, commands and data issued by the host system 1000 are transmitted to the memory management circuit 202 through the host interface 204. In the present exemplary embodiment, the host interface 204 is compatible to the SATA standard. However, the present invention is not limited thereto, and the host interface 204 may also be compatible to the PATA standard, the IEEE 1394 standard, the PCI express standard, the USB standard, the SD standard, the MS standard, the MMC standard, the CF standard, the IDE standard, or any other suitable data transmission standard.

The memory interface 206 is coupled to the memory management circuit 202 and configured to access the rewritable non-volatile memory module 106. Namely, data to be written into the rewritable non-volatile memory module 106 is converted by the memory interface 206 into a format acceptable to the rewritable non-volatile memory module 106.

In addition, in the present exemplary embodiment, the memory controller 104 may further includes a buffer memory 252, a power management circuit 254 and an error checking and correcting (ECC) circuit 256.

The buffer memory 252 is coupled to the memory management circuit 202 and configured to temporarily store data and commands from the host system 1000 or data from the rewritable non-volatile memory module 106. In particular, the memory management circuit 202 loads a program code from the rewritable non-volatile memory module 106 into the buffer memory 252 according to the program code accessing method provided by the present exemplary embodiment.

The power management circuit 254 is coupled to the memory management circuit 202 and configured to control the power supply of the memory storage apparatus 100.

The ECC circuit 256 is coupled to the memory management circuit 202 and configured to check and correct error bits, so as to ensure data accuracy. To be specific, when the memory management circuit 202 receives a write command from the host system 1000, the ECC circuit 256 generates a corresponding ECC code for the data corresponding to the write command, and the memory management circuit 202 stores the data corresponding to the write command and the corresponding ECC code into the rewritable non-volatile memory module 106. Subsequently, when the memory management circuit 202 reads the data from the rewritable non-volatile memory module 106, it also reads the ECC code corresponding to the data, and the ECC circuit 256 checks and corrects error bits in the data according to the ECC code.

Figure 4:
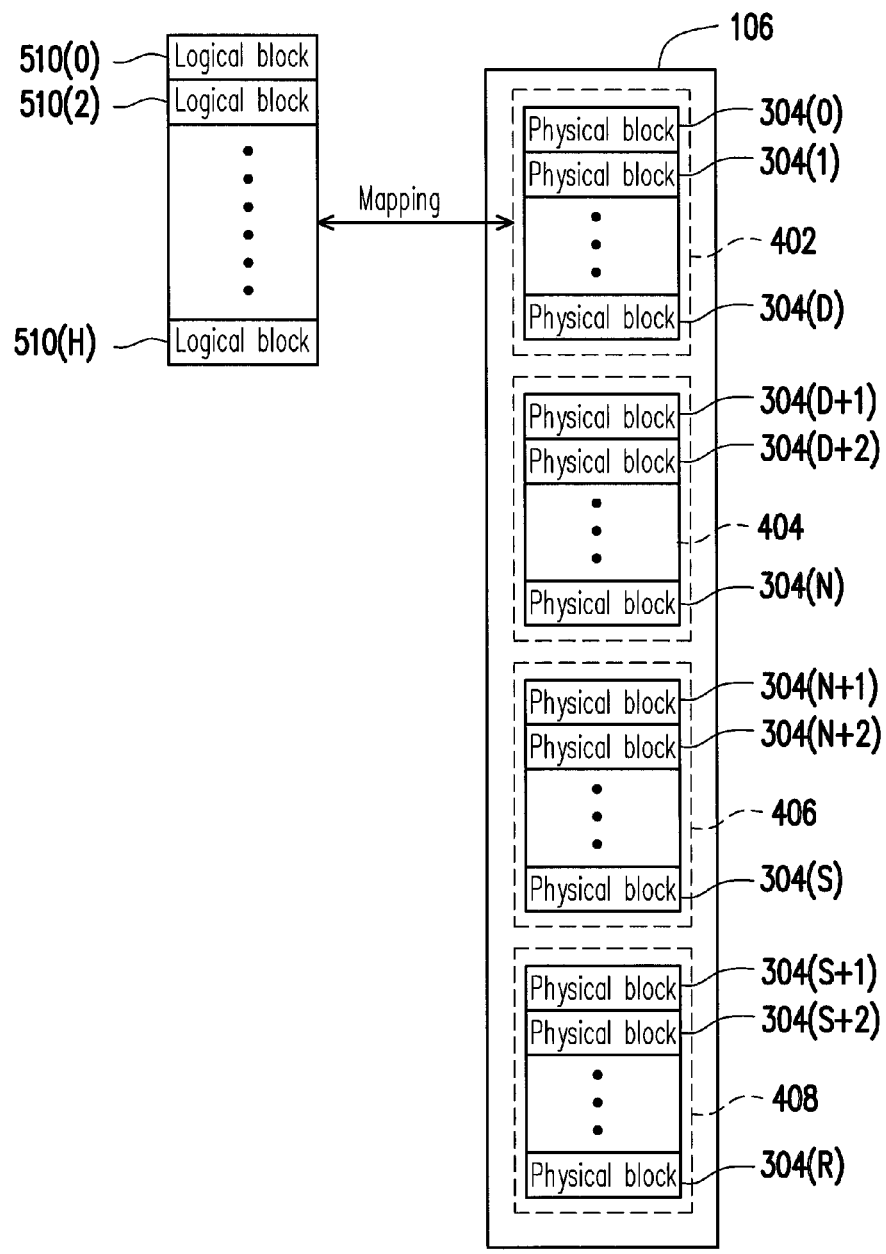
FIG. 4 is a schematic block diagram of a rewritable non-volatile memory module according to the first exemplary embodiment of the invention.

FIG. 4 is a schematic block diagram of a rewritable non-volatile memory module according to the first exemplary embodiment of the invention.

Referring to FIG. 4, the rewritable non-volatile memory module 106 includes physical blocks 304(0)-304(R). In the present exemplary embodiment, the physical blocks 304(0)-304(R) may belong to the same memory die or different memory dies. Each physical block has a plurality of physical pages, wherein the physical pages belonging to the same physical block can be individually written but have to be erased all together. To be specific, physical block is the smallest erasing unit. Namely, each physical block contains the least number of memory cells that are erased all together. Each of the physical pages is the smallest programming unit. Namely, each of the physical pages is the smallest unit for writing data.

In the present exemplary embodiment, the memory management circuit 202 logically groups the physical blocks 304(0)-304(R) of the rewritable non-volatile memory module 106 into a data area 402, a free area 404, a system area 406, and a replacement area 408.

Physical blocks in the data area 402 and the free area 404 are used for storing data received from the host system 1000. To be specific, the physical blocks in the data area 402 are physical blocks already containing data, while the physical blocks in the free area 404 are used for substituting the physical blocks in the data area 402. Thus, the physical blocks in the free area 404 are either blank or usable physical blocks (i.e., no data is recorded therein or data recorded therein is already marked as invalid data). Namely, an erasing operation is already performed on each physical block in the free area 404, or before a physical block is selected from the free area 404 for storing data, an erasing operation is performed on the selected physical block. Thus, the physical blocks in the free area 404 are usable physical blocks.

Physical blocks logically belonging to the system area 406 are used for recording system data, such as the manufacturer and model of the memory storage apparatus, the number of physical blocks in the rewritable non-volatile memory module, and the number of physical pages in each physical block, etc.

Physical blocks logically belonging to the replacement area 408 are replacement physical blocks. For example, when the rewritable non-volatile memory module 106 is manufactured, a part of its physical blocks is reserved for replacement purpose. Namely, when physical blocks in the data area 402, the free area 404, and the system area 406 are damaged, the physical blocks reserved in the replacement area 408 are used for replacing the damaged physical blocks (i.e., bad blocks). Thus, if there are still normal physical blocks in the replacement area 408 and a physical block is damaged, the memory management circuit 202 selects a normal physical block from the replacement area 408 to replace the damaged physical block. If there is no more normal physical block in the replacement area 408 and a physical block is damaged, the memory management circuit 202 announces that the memory storage apparatus 100 is in a write protect state and cannot be used for writing data.

It should be understood that during the operation of the memory storage apparatus 100, the physical blocks associated with the data area 402, the free area 404, the system area 406, and the replacement area 408 dynamically changes. For example, when a physical block in the free area 404 is damaged and replaced by a physical block selected from the replacement area 408, the physical block originally in the replacement area 408 is associated with the free area 404.

The memory management circuit 202 configures logical blocks 510(0)-510(H) to be mapped to the physical blocks in the data area 402, wherein each of the logical blocks has a plurality of logical pages, and the logical pages are sequentially mapped to the physical pages in a corresponding physical block. For example, when the memory storage apparatus 100 is formatted, the logical blocks 510(0)-510(H) are initially mapped to the physical blocks 304(0)-304(D) in the data area 402.

The memory management circuit 202 may maintain a logical block-physical block mapping table to record the mapping relationship between the logical blocks 510(0)-510(H) and the physical blocks in the data area 402. In addition, because the host system 1000 accesses data in units of logical access addresses (for example, sector), when the host system 1000 accesses data, the memory management circuit 202 converts a logical access address into a corresponding logical page. For example, when the host system 1000 is about to access a specific logical access address, the memory management circuit 202 converts the logical access address to be accessed by the host system 1000 into a multi-dimensional address composed of a corresponding logical block and a corresponding logical page and accesses the data in the corresponding physical page according to the logical block-physical block mapping table.

Figure 5A:
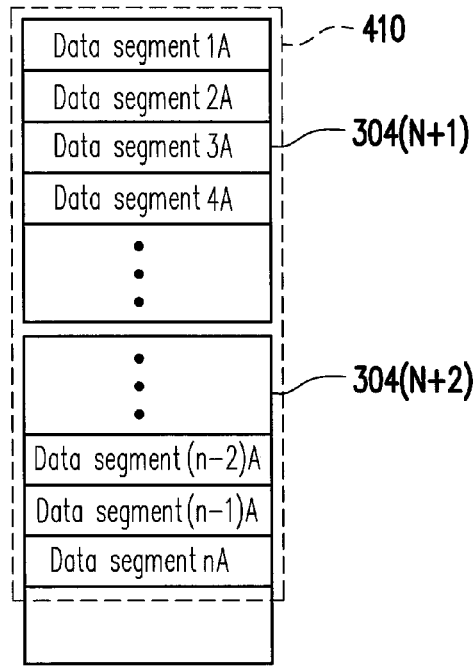
FIG. 5A and FIG. 5B are diagrams of a plurality of program code copies of a program code stored in a rewritable non-volatile memory module according to the first exemplary embodiment of the invention.
Figure 5B:
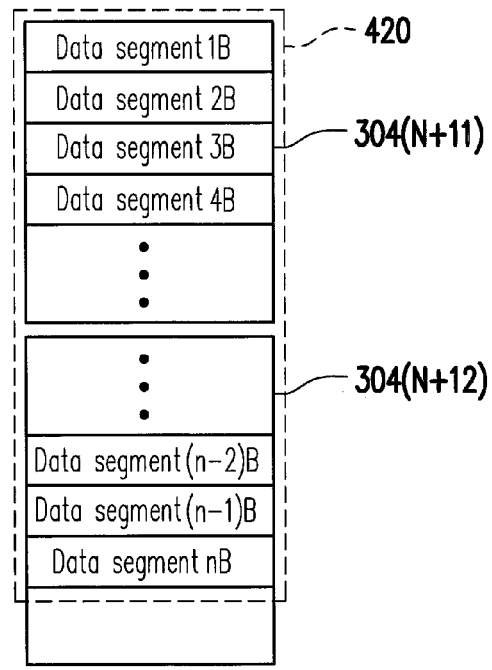

FIG. 5A and FIG. 5B are diagrams of a plurality of program code copies of a program code stored in a rewritable non-volatile memory module according to the first exemplary embodiment of the invention.

Referring to FIG. 5A and FIG. 5B, the physical block 304(N+1) and the physical block 304(N+2) in the system area 406 are used for storing a first program code copy 410 corresponding to the program code used for controlling the overall operation of the memory controller 104, and the physical block 304(N+11) and the physical block 304(N+12) in the system area 406 are used for storing a second program code copy 420 corresponding to the program code used for controlling the overall operation of the memory controller 104. Herein the physical blocks used for storing the first program code copy 410 are referred to as first physical blocks, and the physical blocks used for storing the second program code copy 420 are referred to as second physical blocks.

In the present exemplary embodiment, two program code copies corresponding to the program code used for controlling the overall operation of the memory controller 104 are stored in the rewritable non-volatile memory module 106. However, in another exemplary embodiment of the invention, more program code copies corresponding to the program code used for controlling the overall operation of the memory controller 104 can be stored in the rewritable non-volatile memory module 106. In addition, in the present exemplary embodiment, one program code copy is stored by using two physical blocks. However, the present invention is not limited thereto, and the number of physical blocks for storing one program code copy varies with the size of the program code copy.

As described above, the physical block 304(N+1) and the physical block 304(N+2) store the first program code copy 410, wherein the first program code copy 410 includes n data segments (i.e., data segments 1A-nA, wherein n is a natural number), and the data segments of the first program code copy 410 are identical to the data segments of the program code used for controlling the overall operation of the memory controller 104. Similarly, the physical block 304(N+11) and the physical block 304(N+12) store the second program code copy 420 of the program code, wherein the second program code copy 420 also includes n data segments (i.e., data segments 1B-nB), and the data segments of the second program code copy 420 are identical to the data segments of the program code used for controlling the overall operation of the memory controller 104. Namely, the data segments 1A-nA of the first program code copy 410 are respectively identical to the data segments 1B-nB of the second program code copy 420.

Because adjacent physical blocks are related with each other to a certain extent when a damage occurs, in order to prevent adjacent physical blocks (and accordingly corresponding data segments in the first program code copy 410 and the second program code copy 420) from being damaged at the same time, in the present exemplary embodiment, the first physical blocks storing the first program code copy 410 are not adjacent to the second physical blocks storing the second program code copy 420. However, the present invention is not limited thereto.

In addition, if the physical blocks 304(0)-304(R) belong to different memory dies, the first physical blocks and the second physical blocks respectively belong to different memory dies. For example, the physical blocks 304(0)-304(R) respectively belong to a first memory die and a second memory die, wherein the physical block 304(N+1) and the physical block 304(N+2) belong to the first memory die, and the physical block 304(N+11) and the physical block 304(N+12) belong to the second memory die. Namely, the first program code copy 410 and the second program code copy 420 are respectively stored in different memory dies, so that the possibility that the two program code copies are damaged at the same time is further reduced.

Particularly, in the present exemplary embodiment, when the memory management circuit 202 reads a data segment of a program code copy from the rewritable non-volatile memory module 106, the ECC circuit 256 executes an ECC procedure on the data segment. If the data segment contains an error bit, the ECC circuit 256 tries to correct the error bit. Besides, if the error bit cannot be corrected, the ECC circuit 256 determines that the data segment contains an uncorrectable error bit.

Particularly, when the ECC circuit 256 determines that a data segment of the first program code copy 410 contains at least one uncorrectable error bit, the memory management circuit 202 alternatively loads a part of the first program code copy 410 and a part of the second program code copy 420. Namely, the memory management circuit 202 alternatively loads each data segment of the program code from the first program code copy 410 and the second program code copy 420. This will be described below with reference to another example.

Figure 6:
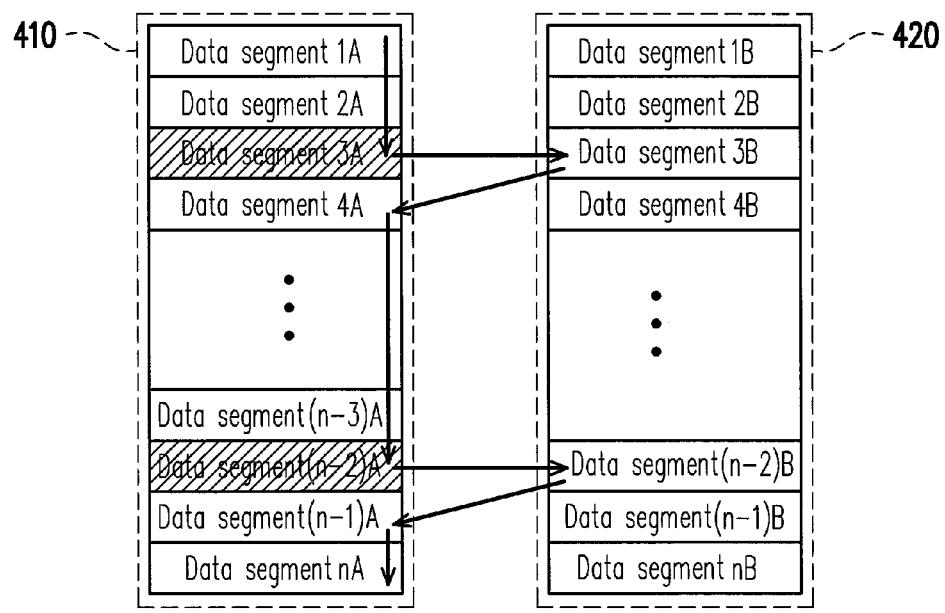
FIG. 6 is a diagram of a program code accessing method according to the first exemplary embodiment of the invention.

FIG. 6 is an operation diagram of a program code accessing method according to a first exemplary embodiment of the present invention, wherein it is assumed that the data segment 3A and the data segment (n-2)A of the first program code copy 410 contain error bits (as indicated by the areas with diagonal lines) that cannot be corrected by the ECC circuit 256, and it is assumed that none of the data segment 3B and the data segment (n-2)B of the second program code copy 420 contains any uncorrectable error bit.

Referring to FIG. 6, the memory management circuit 202 of the memory controller 104 sequentially loads the data segment 1A and the data segment 2A of the first program code copy 410. Subsequently, while loading the data segment 3A, because the ECC circuit 256 cannot correct the error bit, the memory management circuit 202 cannot load the data segment 3A successfully. In this case, the memory management circuit 202 reads the data segment 3B from the second program code copy 420. After successfully loading the data segment 3B, the memory management circuit 202 continues to load the next data segment 4A from the first program code copy 410.

Thereafter, the memory controller 104 sequentially loads the data segments 5A-(n-3)A. Subsequently, while loading the data segment (n-2)A, because the ECC circuit 256 cannot correct the error bit, the memory management circuit 202 cannot load the data segment (n-2)A successfully. In this case, the memory management circuit 202 reads the data segment (n-2)B (the content thereof is identical to that of the data segment (n-2)A) from the second program code copy 420. Besides, after successfully loading the data segment (n-2)B, the memory management circuit 202 continues to load the next data segment (n-1)A from the first program code copy 410. Eventually, the memory controller 104 loads the data segment nA to finish the loading of the entire program code.

It should be noted that in the present exemplary embodiment, it is assumed that the data segment 3B and the data segment (n-2)B of the second program code copy 420 do not contain any uncorrectable error bit. However, if the data segment 3B or the data segment (n-2)B of the second program code copy 420 contains any uncorrectable error bit, the memory management circuit 202 outputs an error message.

It should be understood that in the present exemplary embodiment, it is assumed that there are only two program code copies corresponding to the program code. However, the present invention is not limited thereto. In an example wherein multiple program code copies are stored, when a data segment of one program code copy contains a uncorrectable error bit, the memory management circuit 202 tries to load the data segment from other program code copies until it determines that the correct data segment cannot be loaded from any of the program code copies and issues an error message.

Figure 7A:
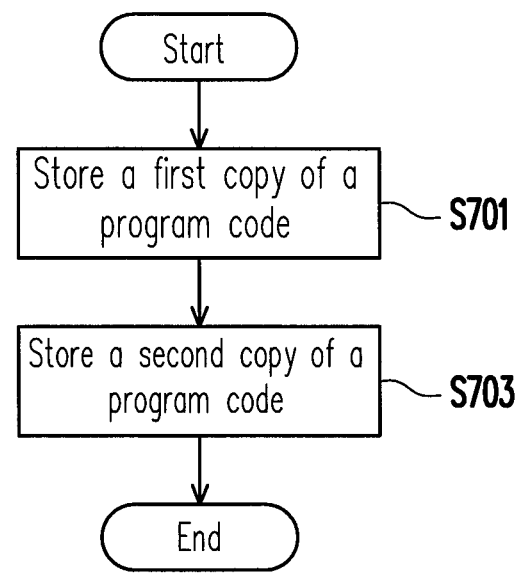
FIG. 7A and FIG. 7B are flowcharts of a program code accessing method according to the first exemplary embodiment of the invention.
Figure 7B:
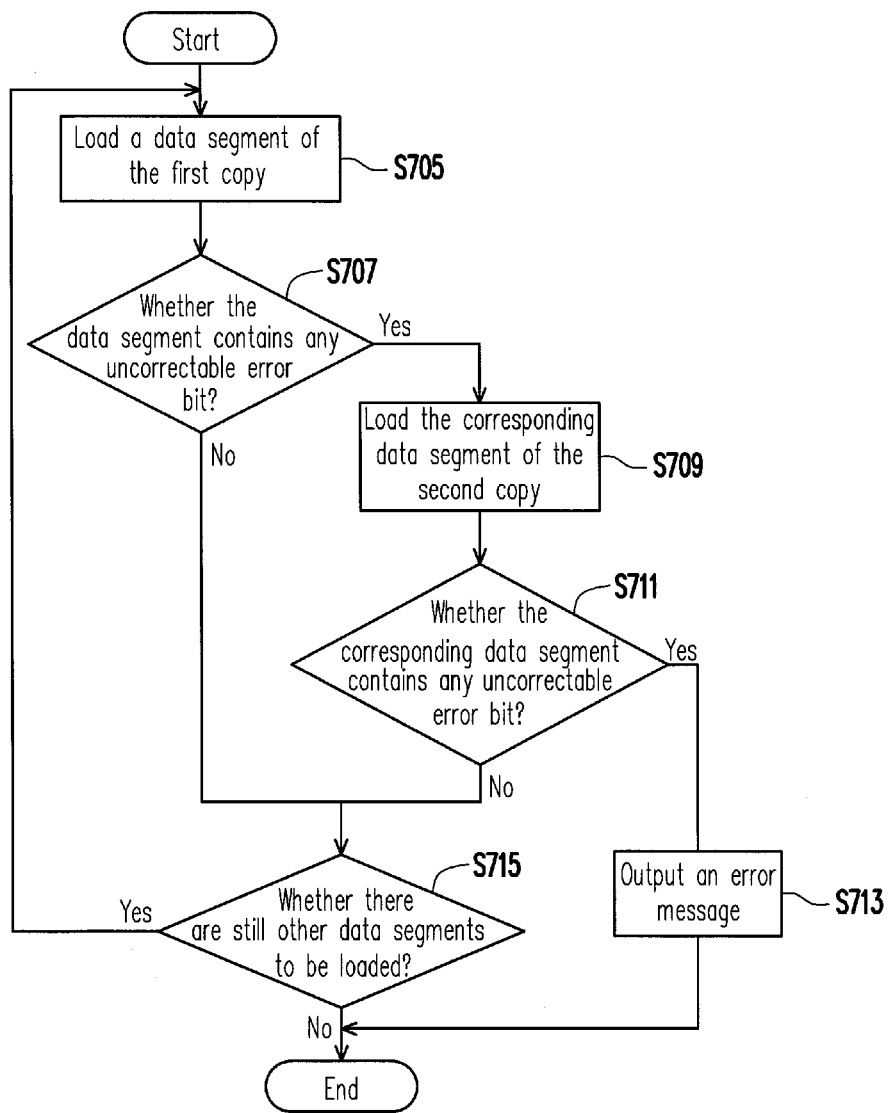

FIG. 7A and FIG. 7B are flowcharts of a program code accessing method according to the first exemplary embodiment of the invention, wherein the steps for storing a program code are illustrated in FIG. 7A, and the steps for loading the program code are illustrated in FIG. 7B.

Referring to FIG. 7A, first, in step S701, a first program code copy 410 corresponding to the program code is stored in the first physical blocks, and in step S703, a second program code copy 420 corresponding to the program code is stored into the second physical blocks.

In the present exemplary embodiment, the physical pages of the first physical blocks and the second physical blocks are sequentially used for storing the first program code copy 410 and the second program code copy 420. However, the present invention is not limited thereto, and in another exemplary embodiment of the invention, the first program code copy 410 and the second program code copy 420 may also be stored into only specific physical pages of the first physical blocks and the second physical blocks.

To be specific, in the present exemplary embodiment, the rewritable non-volatile memory module 106 is a MLC NAND flash memory module. Thus, the physical pages of each physical block in the rewritable non-volatile memory module 106 can be categorized into a plurality of fast physical pages and a plurality of slow physical pages according to their writing characteristics.

To be specific, only single-staged programming can be performed on memory cells of a single level cell (SLC) NAND flash memory, and accordingly, each memory cell can only store one bit. Contrarily, the programming of physical blocks in a MLC NAND flash memory can be performed in multiple stages. For example, the programming of a 4-level cell is carried out in two stages. During the first stage, bits of lower physical pages are programmed, and the physical characteristics of these bits are similar to those of a SLC NAND flash memory. After the first stage is completed, bits of the upper physical pages are programmed. In particular, the write speed of lower physical pages is faster than that of upper physical pages, and the reliability of lower physical pages is higher than that of upper physical pages. Herein lower physical pages are also referred to as fast physical pages, and upper physical pages are also referred to as slow physical pages.

Similarly, an 8-level memory cell or a 16-level memory cell includes more physical pages, and data is written therein in more stages. Herein the physical pages having the fastest write speed are referred to as fast physical pages, and the other physical pages having slower write speeds are all referred to as slow physical pages. Additionally, in other embodiments, the slow physical pages may also be the physical pages having the slowest write speed or the physical pages having the slowest write speed and those physical pages having their write speeds faster than the slowest write speed.

For example, in a 16-level memory cell, the fast physical pages are physical pages having the fastest and the second fastest write speeds, and the slow physical pages are physical pages having the slowest and the second slowest write speeds.

Particularly, in another exemplary embodiment of the present invention, the memory management circuit 202 stores program code copies by using only the fast physical pages of the first physical blocks and the second physical blocks, so as to increase the access efficiency and reliability. Referring to FIG. 7B, in step S705, a data segment of the first program code copy 410 is loaded. Then, in step S707, whether the data segment contains any uncorrectable error bit is determined. To be specific, the ECC circuit 256 executes an ECC procedure on the data segment, and the memory management circuit 202 determines whether the data segment contains any uncorrectable error bit accordingly.

If the data segment contains an uncorrectable error bit, in step S709, the corresponding data segment is loaded from the second program code copy 420. Then, in step S711, whether the corresponding data segment contains any uncorrectable error bit is determined. If the corresponding data segment contains an uncorrectable error bit, in step S713, an error message is output. If the corresponding data segment does not contain any uncorrectable error bit, in step S715, whether there are still other data segments to be loaded is determined. If there are still other data segments to be loaded, step S705 is executed again to continue to load the next data segment of the first program code copy 410. If there is no any other data segment to be loaded (i.e., the entire program code has been loaded), the program code loading procedure is terminated.

If it is determined in step S707 that the data segment does not contain any uncorrectable error bit, step S715 is executed to determine whether there are still other data segments to be loaded. If there is no any other data segment to be loaded (i.e., the entire program code has been loaded), the program code loading procedure is terminated. If there are still other data segments to be loaded, step S705 is executed again to continue to load the next data segment from the first program code copy 410.

Second Exemplary Embodiment

The memory controller, the memory storage apparatus, and the host system in the second exemplary embodiment of the present invention are substantially the same as those in the first exemplary embodiment, and the only difference falls on the program code loading method. To be specific, in the second exemplary embodiment, when an error occurs during the data segment loading procedure, the complete program code is read from two program code copies through a method different from that in the first exemplary embodiment. Below, the difference between the first exemplary embodiment and the second exemplary embodiment will be explained with reference to FIG. 2 and FIG. 3.

Figure 8:
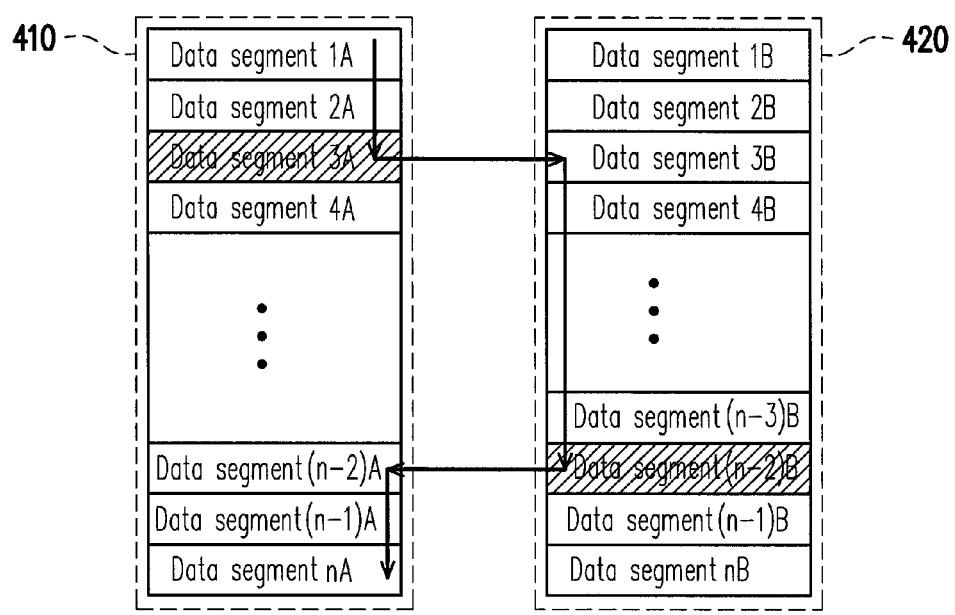
FIG. 8 is a diagram of a program code accessing method according to a second exemplary embodiment of the invention.

FIG. 8 is an operation diagram of a program code accessing method according to a second exemplary embodiment of the invention, wherein it is assumed that the data segment 3A of the first program code copy 410 and the data segment (n−2)B of the second program code copy 420 contain error bits that cannot be corrected by the ECC circuit 256 (as indicated by the areas with diagonal lines), and it is assumed that none of the data segment 3B of the second program code copy 420 and the data segment (n−2)A of the first program code copy 410 contains any uncorrectable error bit.

Referring to FIG. 8, the memory management circuit 202 of the memory controller 104 sequentially loads the data segments 1A and 2A of the first program code copy 410. Subsequently, while loading the data segment 3A, because the ECC circuit 256 cannot correct the error bit, the memory management circuit 202 cannot load the data segment 3A successfully. In this case, the memory management circuit 202 reads the data segment 3B from the second program code copy 420. After successfully loading the data segment 3B, the memory management circuit 202 continues to load the next data segment 4B from the second program code copy 420.

Thereafter, the memory controller 104 sequentially loads the data segments 5B-(n−3)B. Subsequently, while loading the data segment (n−2)B, because the ECC circuit 256 cannot correct the error bit, the memory management circuit 202 cannot load the data segment (n−2)B successfully. In this case, the memory management circuit 202 reads the data segment (n−2)A (the content thereof is identical to that of the data segment (n−2)B) from the first program code copy 410. Besides, after successfully loading the data segment (n−2)A, the memory management circuit 202 continues to load the next data segment (n−1)A from the first program code copy 410. Finally, the memory controller 104 loads the data segment nA of the first program code copy 410 to complete the loading of the entire program code.

Figure 9:
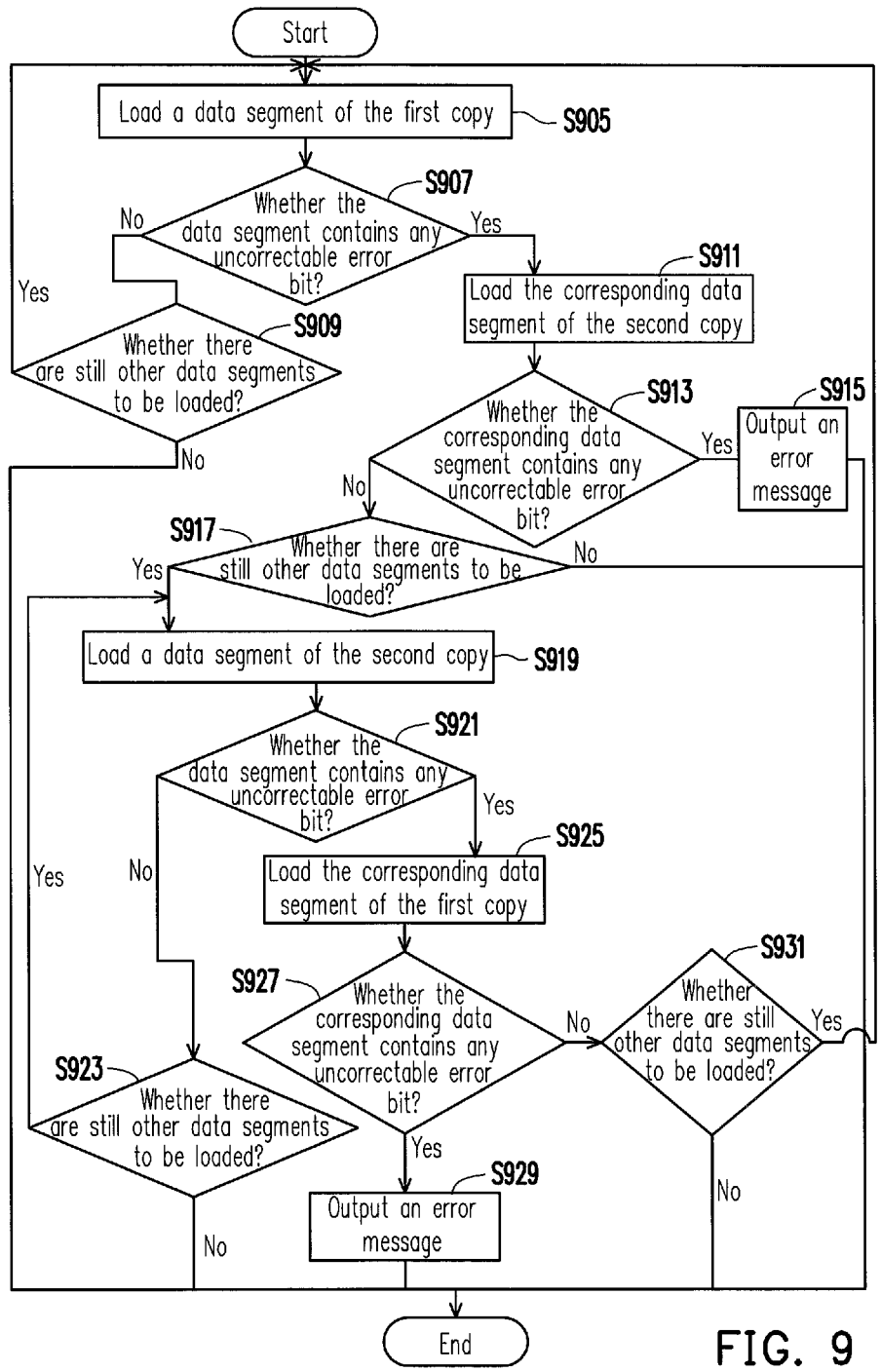
FIG. 9 is a flowchart of a program code loading method according to the second exemplary embodiment of the invention.

FIG. 9 is a flowchart of a program code loading method according to the second exemplary embodiment of the invention.

Referring to FIG. 9, in step S905, a data segment of the first program code copy 410 is loaded.

Then, in step S907, whether the data segment contains any uncorrectable error bit is determined. For example, the ECC circuit 256 executes an ECC procedure on the data segment and determines whether the data segment contains any uncorrectable error bit accordingly.

If it is determined in step S907 that the data segment does not contain any uncorrectable error bit, step S909 is executed to determine whether there are still other data segments to be loaded. If there is no more data segment to be loaded (i.e., the entire program code has been loaded), the program code loading procedure is terminated. If there are still other data segments to be loaded, step S905 is executed to continue to load the next data segment from the first program code copy 410.

If it is determined in step S907 that the data segment contains an uncorrectable error bit, in step S911, the corresponding data segment is loaded from the second program code copy 420.

Next, in step S913, whether the corresponding data segment contains any uncorrectable error bit is determined.

If it is determined in step S913 that the corresponding data segment contains an uncorrectable error bit, in step S915, an error message is output. If it is determined in step S913 that the corresponding data segment does not contain any uncorrectable error bit, in step S917, whether there are still other data segments to be loaded is determined. If there is no more data segment to be loaded (i.e., the entire program code has been loaded), the program code loading procedure is terminated. If there are still other data segments to be loaded, in step S919, the next data segment of the second program code copy 420 is loaded.

After that, in step S921, whether the d data segment contains any uncorrectable error bit is determined. If it is determined in step S921 that the data segment does not contain any uncorrectable error bit, in step S923, whether there are still other data segments to be loaded is determined. If there are still other data segments to be loaded, step S919 is executed again to continue to load the next data segment of the second program code copy 420. If there is no more data segment to be loaded (i.e., the entire program code has been loaded), the program code loading procedure is terminated.

If it is determined in step S921 that the data segment contains an uncorrectable error bit, in step S925, the corresponding data segment is loaded from the first program code copy 410.

Next, in step S927, whether the corresponding data segment contains any uncorrectable error bit is determined.

If it is determined in step S927 that the corresponding data segment contains an uncorrectable error bit, an error message is output in step S929.

If it is determined in step S927 that the corresponding data segment does not contain any uncorrectable error bit, in step S931, whether there are still other data segments to be loaded is determined. If there is no more data segment to be loaded (i.e., the entire program code has been loaded), the program code loading procedure is terminated. If there are still other data segments to be loaded, step S905 is executed to continue to load the next data segment from the first program code copy 410.

In summary, exemplary embodiments of the invention provide a program code loading method, a program code accessing method, a memory controller, and a memory storage apparatus, wherein a complete program code can be loaded from two or more program code copies, so that the situation that the program code cannot be successfully loaded and accordingly the system cannot be started caused by too many bit errors is avoided. Thereby, the reliability of the memory storage apparatus can be effectively improved. The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A program code loading method for loading a program code from a rewritable non-volatile memory module, wherein the program code comprises a plurality of data segments, the rewritable non-volatile memory module has at least one first physical block and at least one second physical block, the first physical block stores a first program code copy corresponding to the program code, the second physical block stores a second program code copy corresponding to the program code, and the first program code copy and the second program code copy respectively have a plurality of data segments identical to the data segments of the program code, the program code loading method comprising:

sequentially loading a first data segment of the first program code copy;

determining whether the first data segment of the first program code copy contains at least one uncorrectable error bit; and when the first data segment of the first program code copy contains at least one uncorrectable error bit, loading a first data segment of the second program code copy; and after loading the first data segment of the second program code copy, sequentially loading a second data segment of the first program code copy, wherein a part of the first program code copy and a part of the second program code copy are loaded.

2. The program code loading method according to claim 1, further comprises:

after loading the first data segment of the second program code copy, continuing to sequentially load a second data segment among the data segments of the first program code copy, wherein the step of sequentially load the second data segment of the first program code copy is performed when the second data segment of the second program code copy contains at least one uncorrectable error bit.

3. A program code accessing method for accessing a program code in a rewritable non-volatile memory module, wherein the rewritable non-volatile memory module has a plurality of physical blocks and the program code comprises a plurality of data segments, the program code accessing method comprising:

storing a first program code copy corresponding to the program code by using at least one first physical block among the physical blocks, wherein the first program code copy has a plurality of data segments identical to the data segments of the program code;

storing a second program code copy corresponding to the program code by using at least one second physical block among the physical blocks, wherein the second program code copy has a plurality of data segments identical to the data segments of the program code;
sequentially loading a first data segment among the data segments of the first program code copy;
determining whether the first data segment of the first program code copy contains at least one uncorrectable error bit; and
when the first data segment of the first program code copy contains at least one uncorrectable error bit, loading a first data segment of the second program code copy; and
after loading the first data segment of the second program code copy, sequentially loading a second data segment of the first program code copy,
wherein a part of the first program code copy and a part of the second program code copy are loaded.

4. The program code accessing method according to claim 3, wherein further comprises:
after loading the first data segment of the second program code copy, continuing to sequentially load a second data segment among the data segments of the first program code copy,
wherein the step of sequentially load the second data segment of the first program code copy is performed when the second data segment of the second program code copy contains at least one uncorrectable error bit.

5. The program code accessing method according to claim 3, wherein the physical blocks respectively belong to a first memory die and a second memory die,
Wherein the first physical block belongs to the first memory die, and the second physical block belongs to the second memory die.

6. The program code accessing method according to claim 3, wherein the second physical block is not adjacent to the first physical block.

7. The program code accessing method according to claim 3, wherein each of the physical blocks has a plurality of fast physical pages and a plurality of slow physical pages,
wherein the step of storing the first program code copy corresponding to the program code by using the first physical block comprises:
storing the first program code copy corresponding to the program code by using only the fast physical pages of the first physical block,
wherein the step of storing the second program code copy corresponding to the program code by using the second physical block comprises:
storing the second program code copy corresponding to the program code by using only the fast physical pages of the second physical block.

8. A memory controller for controlling a rewritable non-volatile memory module, wherein the rewritable non-volatile memory module has a plurality of physical blocks, the memory controller comprising:
a host interface, configured to couple to a host system;
a memory interface, configured to couple to the rewritable non-volatile memory module; and
a memory management circuit, coupled to the host interface and the memory interface, and configured to use at least one first physical block among the physical blocks to store a first program code copy corresponding to a program code, wherein the program code has a plurality of data segments, and the first program code copy has a plurality of data segments identical to the data segments of the program code,
wherein the memory management circuit is further configured to use at least one second physical block among the physical blocks to store a second program code copy corresponding to the program code, wherein the second program code copy has a plurality of data segments identical to the data segments of the program code,
wherein the memory management circuit sequentially loads a first data segment among the data segments of the first program code copy and determines whether the first data segment of the first program code copy contains at least one uncorrectable error bit,
wherein when the first data segment of the first program code copy contains at least one uncorrectable error bit, the memory management circuit loads a first data segment of the second program code copy,
after loading the first data segment of the second program code copy, the memory management circuit sequentially load a second data segment of the first program code copy,
wherein a part of the first program code copy and a part of the second program code copy are loaded.

9. The memory controller according to claim 8, wherein after loading the first data segment of the second program code copy, the memory management circuit continues to sequentially load a second data segment among the data segments of the first program code copy,
wherein when the second data segment of the second program code copy contains at least one uncorrectable error bit, the memory management circuit performs said operation of sequentially loading the second data segment of the first program code copy.

10. The memory controller according to claim 8 further comprising an error checking and correcting (ECC) circuit, wherein the ECC circuit determines whether the first data segment of the first program code copy contains at least one uncorrectable error bit.

11. The memory controller according to claim 8, wherein the second physical block is not adjacent to the first physical block.

12. The memory controller according to claim 8, wherein each of the physical blocks has a plurality of fast physical pages and a plurality of slow physical pages,
wherein the memory management circuit uses only the fast physical pages of the first physical block to store the first program code copy corresponding to the program code,
wherein the memory management circuit uses only the fast physical pages of the second physical block to store the second program code copy corresponding to the program code.

13. A memory storage apparatus, comprising:
a connector, configured to couple to a host system;
a rewritable non-volatile memory module, having a plurality of physical blocks; and
a memory controller, coupled to the connector and the rewritable non-volatile memory module, wherein the memory controller is configured to use at least one first physical block among the physical blocks to store a first program code copy corresponding to a program code, wherein the program code has a plurality of data segments, and the first program code copy has a plurality of data segments identical to the data segments of the program code,
wherein the memory controller is further configured to uses at least one second physical block among the physical blocks to store a second program code copy corresponding to the program code, wherein the second program code copy has a plurality of data segments identical to the data segments of the program code, wherein the memory controller sequentially loads a first data segment among the data segments of the first program code copy and determines whether the first data segment of the first program code copy contains at least one uncorrectable error bit, wherein when the first data segment of the first program code copy contains at least one uncorrectable error bit, the memory controller loads a first data segment of the second program code copy, after loading the first data segment of the second program code copy, the memory controller sequentially load a second data segment of the first program code cop, wherein a part of the first program code copy and a part of the second program code copy are loaded.

14. The memory storage apparatus according to claim 13, wherein after loading the first data segment of the second program code copy, the memory controller continues to sequentially load a second data segment among the data segments of the first program code copy, wherein when the second data segment of the second program code copy contains at least one uncorrectable error bit, the memory controller performs said operation of sequentially loading the second data segment of the first program code copy.

15. The memory storage apparatus according to claim 13, wherein the second physical block is not adjacent to the first physical block.

16. The memory storage apparatus according to claim 13, wherein each of the physical blocks has a plurality of fast physical pages and a plurality of slow physical pages, wherein the memory controller uses only the fast physical pages of the first physical block to store the first program code copy corresponding to the program code, wherein the memory controller uses only the fast physical pages of the second physical block to store the second program code copy corresponding to the program code.

* * * * *